United States Patent
Xu et al.

(10) Patent No.: US 11,837,163 B2
(45) Date of Patent: Dec. 5, 2023

(54) DISPLAY PANEL AND DISPLAY DEVICE INCLUDING INFRARED EMITTING UNITS AND INFRARED RECEIVING UNITS

(71) Applicants: Chengdu BOE Optoelectronics Technology Co., Ltd., Sichuan (CN); BOE TECHNOLOGY GROUP CO., LTD., Beijing (CN)

(72) Inventors: Peng Xu, Beijing (CN); Jianbo Ye, Beijing (CN); Ju Mei, Beijing (CN); Zhenzhen Wang, Beijing (CN); Guoqiang Ma, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/599,057

(22) PCT Filed: Feb. 18, 2021

(86) PCT No.: PCT/CN2021/076698
§ 371 (c)(1),
(2) Date: Sep. 28, 2021

(87) PCT Pub. No.: WO2021/169833
PCT Pub. Date: Sep. 2, 2021

(65) Prior Publication Data
US 2022/0180807 A1 Jun. 9, 2022

(30) Foreign Application Priority Data
Feb. 28, 2020 (CN) .................... 202010130136.X (51) Int. Cl.
*G09G 3/3208* (2016.01)
*G06V 40/16* (2022.01)

(52) U.S. Cl.
CPC ............ *G09G 3/3208* (2013.01); *G06V 40/16* (2022.01); *G09G 2300/0452* (2013.01); *G09G 2330/021* (2013.01); *G09G 2360/14* (2013.01)

(58) Field of Classification Search
CPC .......... G09G 3/30; G09G 3/32; G09G 3/3208; G09G 2300/0452; G09G 2330/021;
(Continued)

(56) References Cited

U.S. PATENT DOCUMENTS

2015/0331508 A1  11/2015  Nho et al.
2015/0364107 A1*  12/2015  Sakariya ................. G06F 3/042
                                          345/82
(Continued)

FOREIGN PATENT DOCUMENTS

CN  104009067 A  8/2014
CN  107045628 A  8/2017
(Continued)

OTHER PUBLICATIONS

China Patent Office, First Office Action dated Apr. 27, 2022 for application No. CN202010130136.X.

*Primary Examiner* — Keith L Crawley
(74) *Attorney, Agent, or Firm* — HOUTTEMAN LAW LLC (57) ABSTRACT

The present disclosure provides a display panel having a display area and including: a plurality of infrared emitting units and a plurality of infrared receiving units in the display area. The plurality of infrared emitting units are configured to emit infrared light to outside of the display panel, and the plurality of infrared receiving units are configured to receive the infrared light reflected by an object outside the display panel and output an electrical signal according to the received infrared light.

16 Claims, 6 Drawing Sheets

(58) Field of Classification Search
CPC ............... G09G 2360/14; G06V 40/13; G06V 40/1318; G06V 40/16; G06V 40/161; G06V 40/172; G06F 3/01; G06F 3/011; G06F 21/32; H01L 27/3218; H01L 27/3225–3234; H01L 27/3246; H01L 27/326; H10K 59/10–122; H10K 59/30–751
See application file for complete search history.

(56) References Cited

U.S. PATENT DOCUMENTS

| | | | | |
|---|---|---|---|---|
| 2018/0198980 A1* | 7/2018 | Takagi | ............... | H04N 5/22525 |
| 2018/0261655 A1* | 9/2018 | Lee | ............... | H01L 27/3213 |
| 2019/0013368 A1* | 1/2019 | Chung | ............... | H01L 27/30 |
| 2019/0065717 A1* | 2/2019 | Won | ............... | G06V 10/143 |
| 2019/0363792 A1* | 11/2019 | Tsonev | ............... | G06T 1/00 |
| 2020/0083302 A1* | 3/2020 | Park | ............... | H01L 51/5218 |
| 2021/0066669 A1* | 3/2021 | Kubota | ............... | H01L 51/5246 |
| 2021/0136298 A1* | 5/2021 | Stec | ............... | G06V 10/17 |
| 2021/0357608 A1* | 11/2021 | Tang | ............... | G09G 3/20 |
| 2022/0102430 A1* | 3/2022 | Yamazaki | ............... | H01L 27/3234 |
| 2022/0173174 A1* | 6/2022 | Hatsumi | ............... | H01L 27/3206 |

FOREIGN PATENT DOCUMENTS

| | | |
|---|---|---|
| CN | 108628398 A | 10/2018 |
| CN | 109509767 A | 3/2019 |
| CN | 110061041 A | 7/2019 |
| CN | 111312788 A | 6/2020 |
| WO | 2019052253 A1 | 3/2019 |

* cited by examiner

DISPLAY PANEL AND DISPLAY DEVICE INCLUDING INFRARED EMITTING UNITS AND INFRARED RECEIVING UNITS

CROSS-REFERENCE TO RELATED APPLICATION

This is a National Phase Application filed under 35 U.S.C. 371 as a national stage of PCT/CN2021/076698, filed on Feb. 18, 2021, an application claiming the benefit of priority to Chinese Patent Application No. 202010130136.X filed to China National Intellectual Property Administration on Feb. 28, 2020, the contents of which are incorporated herein in their entirety by reference.

TECHNICAL FIELD

The present disclosure relates to the field of display technology, and particularly relates to a display panel and a display device including the same.

BACKGROUND

With the development of the display technology, display devices have been equipped with more and more functions. In such a competitive market environment, how to improve the user experience is particularly important.

In the related art, security in using a display device is generally ensured by setting a login password, fingerprint recognition, or the like. Currently, a method for unlocking the display device through facial recognition emerges.

SUMMARY

As an aspect of the present disclosure, there is provided a display panel having a display area and including:

a plurality of infrared emitting units and a plurality of infrared receiving units in the display area, wherein the plurality of infrared emitting units are configured to emit infrared light to outside of the display panel, and the plurality of infrared receiving units are configured to receive the infrared light reflected by an object outside the display panel and output an electrical signal according to the received infrared light.

In an embodiment of the present disclosure, the display area includes a plurality of pixel sub-regions arranged in a plurality of rows and a plurality of columns, and each of the plurality of pixel sub-regions includes a plurality of sub-pixel units and one of the infrared emitting unit and the infrared receiving unit.

In an embodiment of the present disclosure, each of the plurality of pixel sub-regions includes a first sub-pixel unit of a first color, a second sub-pixel unit of a second color, and a third sub-pixel unit of a third color, the first color, the second color, and the third color are different from each other, the first sub-pixel unit and the second sub-pixel unit are in a same column, and the third sub-pixel unit is in the same column as one of the infrared emitting unit and the infrared receiving unit included in the pixel sub-region.

In an embodiment of the present disclosure, each column of pixel sub-regions include a plurality of pairs of pixel sub-regions, each pair of pixel sub-regions includes a first pixel sub-region and a second pixel sub-region adjacent in a column direction, the first pixel sub-region includes the infrared emitting unit, and the second pixel sub-region includes the infrared receiving unit.

In an embodiment of the present disclosure, the infrared emitting unit included in the first pixel sub-region is adjacent in the column direction to the infrared receiving unit included in the second pixel sub-region, and the second sub-pixel unit included in the first pixel sub-region is adjacent in the column direction to the first sub-pixel unit included in the second pixel sub-region.

In an embodiment of the present disclosure, each column of pixel sub-regions include a plurality of pairs of pixel sub-regions, and each pair of pixel sub-regions includes a first pixel sub-region and a second pixel sub-region adjacent in a column direction; and the first pixel sub-region and the second pixel sub-region both include the infrared emitting unit, or the first pixel sub-region and the second pixel sub-region both include the infrared receiving unit.

In an embodiment of the present disclosure, the first pixel sub-region and the second pixel sub-region share one infrared emitting unit, or the first pixel sub-region and the second pixel sub-region share one infrared receiving unit.

In an embodiment of the present disclosure, the first sub-pixel unit is a red sub-pixel unit, the second sub-pixel unit is a green sub-pixel unit, and the third sub-pixel unit is a blue sub-pixel unit.

In an embodiment of the present disclosure, in each column where the blue sub-pixel units are located, every two adjacent blue sub-pixel units form a pair, and the infrared receiving unit and/or the infrared emitting unit is disposed between two adjacent pairs of blue sub-pixel units.

In an embodiment of the present disclosure, in a same column of pixel sub-regions, both the infrared receiving unit and the infrared emitting unit are disposed.

In an embodiment of the present disclosure, in each pixel sub-region, a sum of a number of the plurality of sub-pixel units and a number of the infrared receiving unit or the infrared emitting unit in the pixel sub-region is the same.

In an embodiment of the present disclosure, either the infrared receiving unit or the infrared emitting unit is provided in a same column of pixel sub-regions.

In an embodiment of the present disclosure, the plurality of pixel sub-regions include first pixel sub-region columns and second pixel sub-region columns, each of the first pixel sub-region column and the second pixel sub-region column includes multiple pixel sub-regions arranged in the column direction, the first pixel sub-region columns and the second pixel sub-region columns are alternately arranged in a row direction, the infrared emitting unit is disposed in the first pixel sub-region column, and the infrared receiving unit is disposed in the second pixel sub-region column.

In an embodiment of the present disclosure, the infrared emitting unit and the infrared receiving unit are in different rows.

In an embodiment of the present disclosure, the infrared emitting unit includes an infrared light emitting diode, and the display panel further includes a driving circuit structure configured to drive the infrared emitting unit to emit the infrared light and drive the infrared receiving unit to convert the received infrared light into the electrical signal.

In an embodiment of the present disclosure, each infrared receiving unit includes a switch transistor and an infrared sensing unit, the driving circuit structure includes a plurality of recognition gate lines and a plurality of recognition data lines, the plurality of infrared receiving units are arranged in a plurality of rows and a plurality of columns, the plurality of recognition gate lines are in one-to-one correspondence with the plurality of rows of infrared receiving units, and the plurality of recognition data lines are in one-to-one correspondence with the plurality of columns of infrared receiving units; and a gate electrode of the switch transistor is electrically coupled to a corresponding recognition gate line, a first electrode of the switch transistor is configured to be electrically coupled to an initial signal terminal, a second electrode of the switch transistor is electrically coupled to an input terminal of a corresponding infrared sensing unit, and an output terminal of the infrared sensing unit is electrically coupled to a corresponding recognition data line.

In an embodiment of the present disclosure, the driving circuit structure is on a display substrate of the display panel, the display panel further includes a pixel defining layer on a side of the driving circuit structure facing away from the display substrate to define a plurality of first openings in which the plurality of infrared emitting units are disposed and a plurality of second openings in which the plurality of infrared receiving units are disposed.

In an embodiment of the present disclosure, the sub-pixel unit includes an organic light emitting diode, the pixel defining layer further defines a plurality of pixel openings, the organic light emitting diode is disposed in the pixel opening, and the driving circuit structure is further configured to drive the organic light emitting diode to emit light.

As another aspect of the present disclosure, there is provided a display device, including the display panel according to the present disclosure.

In an embodiment of the present disclosure, the display device further includes a processor configured to: generate face information according to the electrical signal generated by the infrared receiving unit; and compare the generated face information with pre-stored face information to generate a determination result.

BRIEF DESCRIPTION OF THE DRAWINGS

The accompanying drawings, which are included to provide a further understanding of the present disclosure and constitute a part of this specification, illustrate the present disclosure together with the following detailed description, but do not constitute a limitation of the present disclosure. In the drawings.

DETAILED DESCRIPTION

The following detailed description of the embodiments of the present disclosure refers to the accompanying drawings. It should be understood that the embodiments described herein are given for the purpose of illustrating and explaining the present disclosure only, and are not intended to limit the present disclosure.

In the related art, a front camera is generally used to recognize a human face. The front camera is small in size and integrated on a frame of a display device. If a facial recognition function is added, more elements need to be arranged in the front camera, which increases the complexity of the process. Moreover, once the number of elements in the front camera is increased, the size of the front camera is increased, which is not favorable for realizing a narrow bezel.

In view of this, as one aspect of the present disclosure, a display panel is provided, which has a display area in which a plurality of sub-pixel units are disposed. The display panel further includes a plurality of infrared emitting units and a plurality of infrared receiving units, which are arranged in the display area. The orientation of a light emitting surface of the infrared emitting unit is the same as that of a display surface (the display surface is marked with 'A' in FIG. 2) of the display panel so as to emit infrared light to the outside of the display panel, and the orientation of a receiving surface of the infrared receiving unit is also the same as that of the display surface of the display panel so as to receive the infrared light reflected by an object outside the display panel and output an electrical signal according to the received infrared light.

The term "display area" as used herein refers to an area of the display panel where an image is actually displayed. As used herein, the term "sub-pixel unit" refers to a light emitting region of a sub-pixel, such as a region corresponding to a light emitting layer in an organic light emitting diode display panel. In some embodiments, the organic light emitting diode display panel includes a light emitting portion and a non-light emitting portion, and in the context of the present disclosure, the sub-pixel unit refers to a region corresponding to the light emitting portion of the organic light emitting diode display panel. For example, the sub-pixel unit may be a light emitting region of a red sub-pixel. For example, the sub-pixel unit may be a light emitting region of a green sub-pixel. For example, the sub-pixel unit may be a light emitting region of a blue sub-pixel. For example, the sub-pixel unit may be a light emitting region of a white sub-pixel.

The display panel according to the embodiment of the present disclosure is applicable to a display device, and when the display panel is used for facial recognition, the infrared emitting unit is driven to emit infrared light. If an object with a high temperature (such as a human face H in FIG. 2) exists outside the display surface of the display panel, the infrared light is reflected back to the display panel after being irradiated on the object with the high temperature, and is irradiated on the receiving surface of the infrared receiving unit.

Each of the infrared receiving units that receive the reflected infrared light may output an electrical signal according to the received infrared light.

For a human face, facial features at different positions are different, so that the infrared receiving units receive the reflected infrared light at different times and with different intensities, and accordingly, the electrical signals output by the infrared receiving units may be different. From the intensities of the electrical signals output from the infrared receiving units at different positions and the time when the electrical signals are output, the facial features of the person may be determined.

In the display panel according to the embodiment of the present disclosure, a plurality of infrared emitting units and a plurality of infrared receiving units may be disposed in the display area, and may be arranged throughout the display area, which reduces the difficulty of arrangement without increasing the bezel width. In addition, compared with the related art of integrating the facial recognition function in the front camera, in the technical solution provided by the present disclosure, the number of recognition units (namely, the infrared emitting units and the infrared receiving units) is more, so that the recognition precision is higher, and the improvement of the user experience is facilitated.

Figure 1:
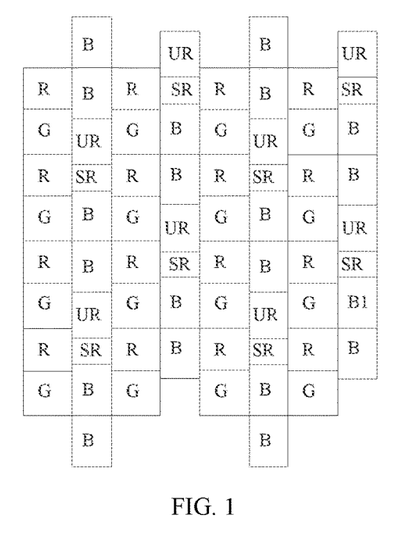
FIG. 1 is a schematic diagram illustrating an arrangement of sub-pixel units and recognition units in a display panel according to an embodiment of the present disclosure.
Figure 2:
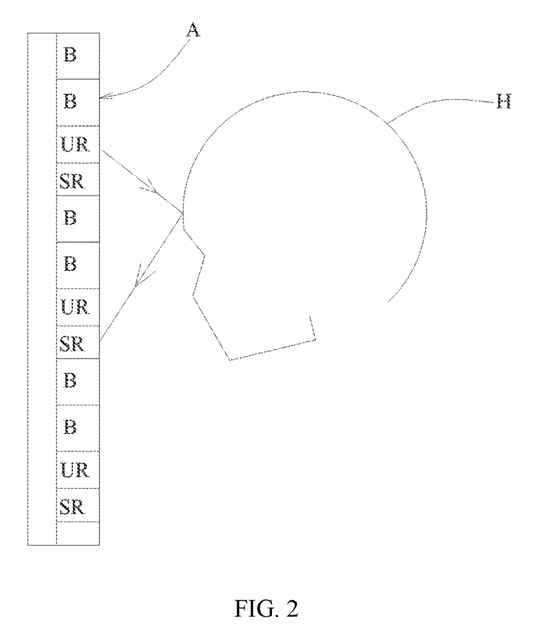
FIG. 2 is a schematic diagram illustrating an operation principle of a plurality of infrared emitting units and a plurality of infrared receiving units in a display panel according to an embodiment of the present disclosure.

FIG. 1 is a schematic diagram illustrating an arrangement of sub-pixel units and recognition units in a display panel according to an embodiment of the present disclosure. In FIG. 1, a plurality of infrared emitting units UR and a plurality of infrared receiving units SR disposed in the display area are shown. As shown in FIG. 2, the emitting surface of the infrared emitting unit UR and the receiving surface of the infrared receiving unit SR are oriented in the same direction as the display surface A.

The infrared emitting unit UR may emit infrared light to the outside of the display panel, and if an object having a relatively high temperature (e.g., a human face H) is present on the display side of the display panel, the human face may reflect at least a part of the infrared light back to the display surface to be received by the infrared receiving unit SR.

In the present disclosure, the sizes of the sub-pixel unit, the infrared emitting unit UR, and the infrared receiving unit SR are not particularly limited. In some embodiments, the size of the light emitting surface of the infrared emitting unit UR may be larger than the size of the light emitting surface of the sub-pixel unit and the size of the receiving surface of the infrared receiving unit SR, so that it is possible to ensure that a sufficient amount of infrared light reaches the human face H.

As an optional embodiment, the side length of the sub-pixel unit and the side length of the infrared receiving unit SR may be about 10 μm, and the side length of the infrared emitting unit UR may be about 20 μm.

To facilitate driving and detection, in some embodiments, the plurality of infrared emitting units UR are arranged in a plurality of rows and a plurality of columns, and the plurality of infrared receiving units SR are arranged in a plurality of rows and a plurality of columns. The display panel may also include a plurality of recognition gate lines and a plurality of recognition data lines, the plurality of rows of infrared emitting units are in one-to-one correspondence with the plurality of recognition gate lines, and the infrared emitting units in a same row share a same recognition gate line. The plurality of columns of infrared receiving units are in one-to-one correspondence with the plurality of recognition data lines, and the infrared receiving units in a same column share a same recognition data line. The electrical signal output by the recognition data line is related to whether the corresponding infrared receiving unit receives infrared light.

The plurality of recognition gate lines are used to drive the plurality of rows of infrared emitting units row by row to emit infrared light, and shape characteristics of an object in front of the display surface may be determined by receiving and identifying the electrical signals output by the recognition data lines. If an operator faces the display surface, the facial features of the operator may be determined by receiving and identifying the electrical signals output by the respective recognition data lines.

In the present disclosure, the relative position relationship between the sub-pixel units and the infrared emitting units UR and the infrared receiving units SR is not particularly limited. In the present disclosure, the specific number of the infrared receiving units SR and the infrared emitting units UR to be provided is not particularly limited, as long as the display panel can achieve a desired display resolution and a desired recognition accuracy.

In an embodiment of the present disclosure, the display area includes a plurality of pixel sub-regions arranged in a plurality of rows and a plurality of columns, and each pixel sub-region includes sub-pixel units and one of the infrared emitting unit and the infrared receiving unit therein.

In an embodiment of the present disclosure, each pixel sub-region includes a first sub-pixel unit of a first color, a second sub-pixel unit of a second color, and a third sub-pixel unit of a third color, the first color, the second color, and the third color are different from each other, the first sub-pixel unit and the second sub-pixel unit are located in a same column, and the third sub-pixel unit and the infrared emitting unit or the infrared receiving unit included in the pixel sub-region are located in a same column.

As an optional embodiment, as shown in FIG. 1, three sub-pixel units with different colors are disposed in each pixel sub-region, two of the three sub-pixel units are located in the same column, and the other one of the three sub-pixel units is located in the same column as the infrared receiving unit SR or the infrared emitting unit UR disposed in the pixel sub-region.

Each pixel sub-region is provided therein with not only the sub-pixel units, but also the infrared emitting unit UR or the infrared receiving unit SR, so that high display resolution and high recognition accuracy can be realized.

In order to improve the uniformity of light emission and improve the recognition accuracy, in each pixel sub-region, the sum of the number of the sub-pixel units and the number of the infrared receiving unit or the infrared emitting unit in the pixel sub-region is identical.

For ease of description, the infrared emitting unit and the infrared receiving unit may be collectively referred to as a recognition unit. That is, in each pixel sub-region, the sum of the number of the sub-pixel units and the number of recognition unit is identical. In some embodiments, in each pixel sub-region, the number of display units is the same, and the number of recognition unit is the same. For example, each pixel sub-region includes three sub-pixel units and one recognition unit. In some embodiments, the total number of the sub-pixel units is three times the total number of the recognition units for the entire display panel. In some embodiments, the infrared emitting units and the infrared receiving units are equal in number and uniformly distributed for the entire display panel.

Figure 3:
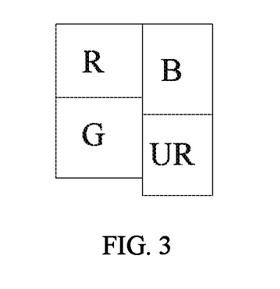
FIGS. 3 and 4 are schematic diagrams of two pixel sub-regions adjacent in a column direction in the display panel shown in FIG. 1, respectively.
Figure 4:
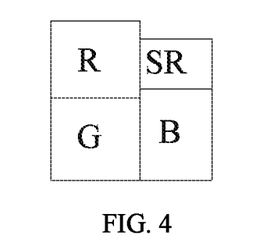

In the embodiments shown in FIGS. 1, 3 and 4, the sum of the number of the sub-pixel units and the number of recognition unit in each pixel sub-region is 4.

Figure 5:
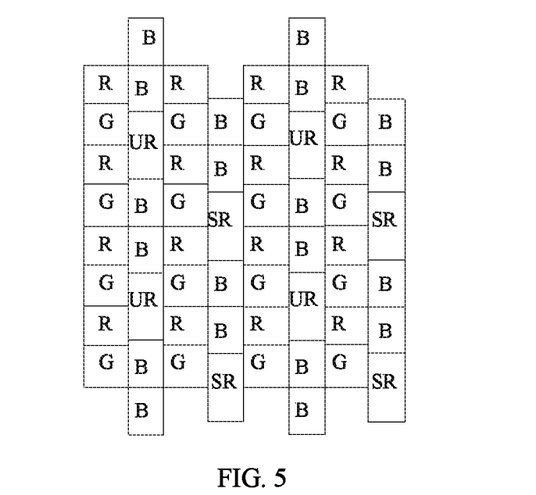
FIG. 5 is a schematic diagram illustrating an arrangement of sub-pixel units and recognition units in a display panel according to an embodiment of the present disclosure.

In the embodiments of the present disclosure, as shown in FIG. 1 and FIG. 5, three sub-pixel units in the same pixel sub-region are a red sub-pixel unit R, a green sub-pixel unit G, and a blue sub-pixel unit B, respectively, and the red sub-pixel unit R and the green sub-pixel unit G are located in the same column. The blue sub-pixel unit B is located in the same column as the infrared emitting unit UR and/or the infrared receiving unit SR.

Among red light, green light and blue light, blue light has the shortest wavelength, and is relatively difficult to be captured by human eyes. Arranging blue sub-pixel units in a same column is beneficial for human eyes to capture the blue light and improve the user experience.

In order to ensure user's visual experience, in some embodiments, in the column where the blue sub-pixel units are located, every two adjacent blue sub-pixel units B form a pair, and the infrared receiving unit SR and/or the infrared emitting unit UR are disposed between two adjacent pairs of blue sub-pixel units B.

As an optional embodiment, as shown in FIG. 1, in the same column of pixel sub-regions, both the infrared receiving unit SR and the infrared emitting unit UR are disposed. In the same column, the infrared emitting unit UR is in the previous row of the infrared receiving unit SR, and the blue sub-pixel unit B is in the next row of the infrared receiving unit SR.

In an embodiment of the present disclosure, each column of pixel sub-regions includes a plurality of pairs of pixel sub-regions, each pair of pixel sub-regions includes a first pixel sub-region and a second pixel sub-region that are adjacent in the column direction, the first pixel sub-region includes the infrared emitting unit, and the second pixel sub-region includes the infrared receiving unit. In some embodiments, the infrared emitting unit included in the first pixel sub-region and the infrared receiving unit included in the second pixel sub-region are adjacent in the column direction, and the second sub-pixel unit included in the first pixel sub-region and the first sub-pixel unit included in the second pixel sub-region are adjacent in the column direction.

FIGS. 3 and 4 are schematic diagrams of two pixel sub-regions adjacent in the column direction in the display panel shown in FIG. 1, respectively. FIG. 3 is a schematic structural diagram of a pixel sub-region located in the previous row, in which a red sub-pixel unit R, a green sub-pixel unit G, a blue sub-pixel unit B, and an infrared emitting unit UR are disposed. FIG. 4 is a schematic structural diagram of a pixel sub-region located in the next row, in which a red sub-pixel unit R, a green sub-pixel unit G, a blue sub-pixel unit B, and an infrared receiving unit SR are disposed. The infrared receiving unit SR is adjacent to the infrared emitting unit UR in the column direction, and the green sub-pixel unit G in the pixel sub-region of the previous row is adjacent to the red sub-pixel unit R in the pixel sub-region of the next row in the column direction.

As another optional embodiment, as shown in FIG. 5, only the infrared receiving unit SR is disposed in a same column of pixel sub-regions, or only the infrared emitting unit UR is disposed in a same column of pixel sub-regions.

In an embodiment of the present disclosure, the plurality of pixel sub-regions include first pixel sub-region columns and second pixel sub-region columns, each of the first pixel sub-region column and the second pixel sub-region column includes a plurality of pixel sub-regions arranged along the column direction, the first pixel sub-regions column and the second pixel sub-region columns are alternately arranged in a row direction, the infrared emitting unit UR is disposed in the first pixel sub-region column, and the infrared receiving unit SR is disposed in the second pixel sub-region column.

In the embodiment of the present disclosure, the infrared emitting units UR and the infrared receiving units SR are uniformly distributed in the display panel. In order to receive the infrared light reflected by each area of the human face as uniformly as possible and improve the recognition accuracy, the infrared emitting unit UR and the infrared receiving unit SR may be located in different rows.

In an embodiment of the present disclosure, each column of pixel sub-regions includes a plurality of pairs of pixel sub-regions, and each pair of pixel sub-regions includes a first pixel sub-region and a second pixel sub-region adjacent in the column direction; the first pixel sub-region and the second pixel sub-region both include the infrared emitting unit, or the first pixel sub-region and the second pixel sub-region both include the infrared receiving unit. In some embodiments, the first pixel sub-region and the second pixel sub-region share one infrared emitting unit, or the first pixel sub-region and the second pixel sub-region share one infrared receiving unit.

Figure 6:
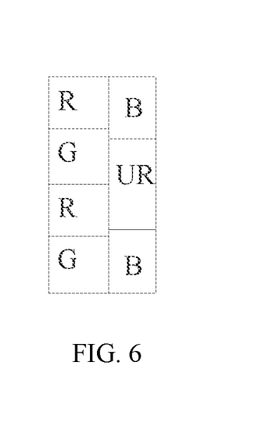
FIG. 6 is a schematic diagram of two pixel sub-regions adjacent in the column direction in the display panel shown in FIG. 5.

FIG. 6 is a schematic diagram of two pixel sub-regions adjacent in the column direction in the display panel shown in FIG. 5. As shown in FIG. 6, a red sub-pixel unit R, a green sub-pixel unit G, a blue sub-pixel unit B, and an infrared emitting unit UR are disposed in the pixel sub-region in the previous row; and a red sub-pixel unit R, a green sub-pixel unit G, a blue sub-pixel unit B and an infrared emitting unit UR are disposed in the pixel sub-region in the next row. The pixel sub-region in the previous row and the pixel sub-region in the next row share the same infrared emitting unit UR.

In the embodiment shown in FIG. 6, one infrared emitting unit UR is disposed in two pixel sub-regions adjacent in the column direction. As shown in FIG. 5, in a column of pixel sub-regions adjacent to the column shown in FIG. 6, only the infrared receiving unit SR of the recognition unit is disposed.

In the present disclosure, how to drive the infrared emitting unit UR to emit infrared light is not particularly limited. As an optional implementation, the infrared emitting unit UR includes an infrared light emitting diode, and the display panel further includes a driving circuit structure configured to drive the infrared emitting unit UR to emit infrared light and drive the infrared receiving unit SR to convert the received infrared light into an electrical signal.

Figure 11:
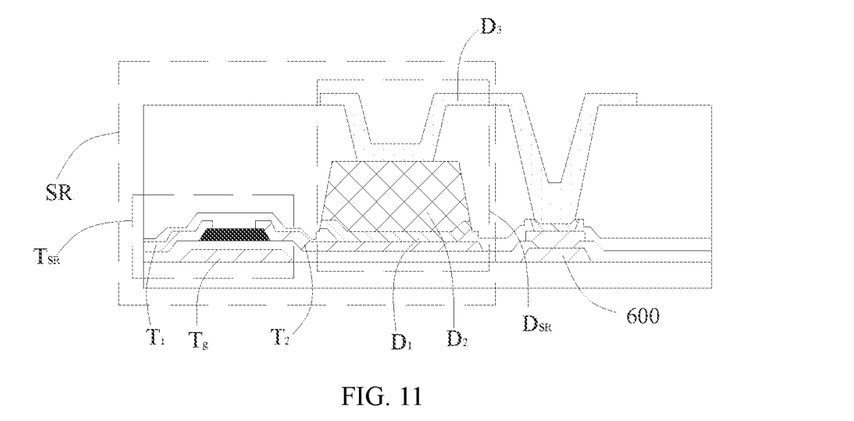
FIG. 11 is a schematic structural diagram of an infrared receiving unit in a display panel according to an embodiment of the present disclosure.
Figure 12:
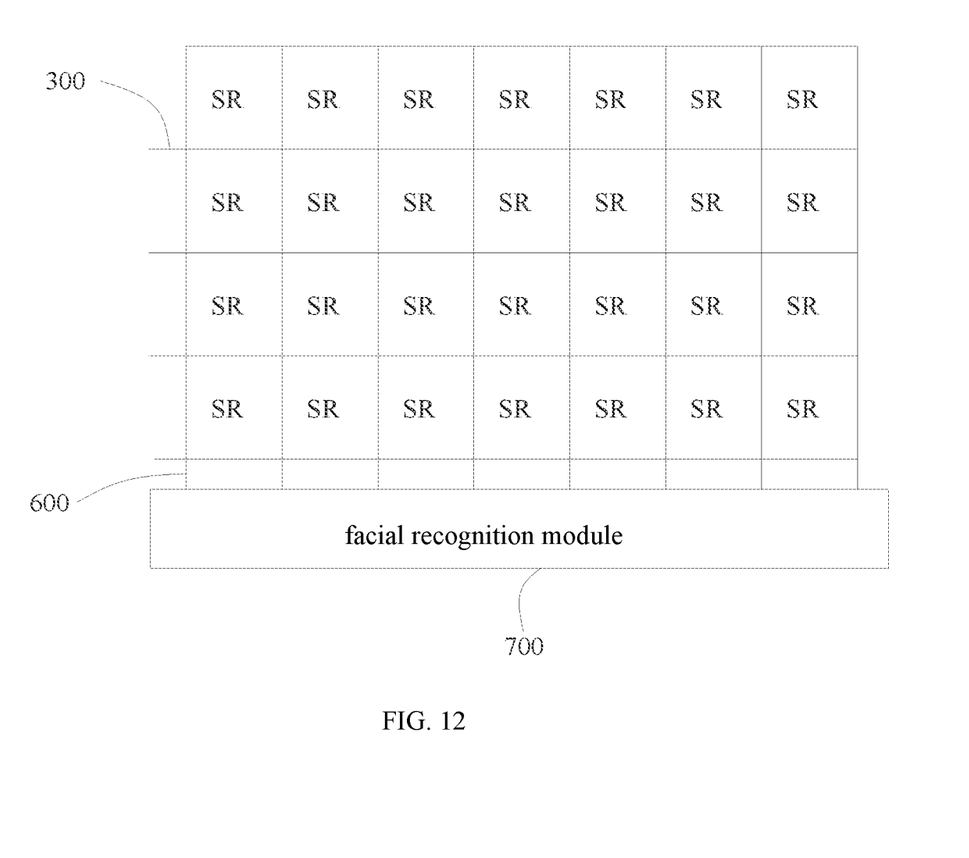
FIG. 12 is a schematic diagram illustrating an arrangement of infrared receiving units in a display panel according to an embodiment of the present disclosure.

In the present disclosure, the specific structure of the infrared receiving unit SR is not particularly limited. As shown in FIG. 11, the infrared receiving unit SR includes a switch transistor $T_{SR}$ and an infrared sensing unit $D_{SR}$, and the driving circuit structure includes a plurality of recognition gate lines 300 (see FIG. 12) and a plurality of recognition data lines 600, as shown in FIG. 12, the plurality of infrared receiving units SR are arranged in a plurality of rows and a plurality of columns, the plurality of recognition gate lines 300 are in one-to-one correspondence with the plurality of rows of infrared receiving units SR, and the plurality of recognition data lines 600 are in one-to-one correspondence with the plurality of columns of infrared receiving units SR.

A gate electrode $T_g$ of the switch transistor $T_{SR}$ is electrically coupled to a corresponding recognition gate line, a first electrode $T_1$ of the switch transistor $T_{SR}$ is electrically coupled to an initial signal terminal, a second electrode $T_2$ of the switch transistor $T_{SR}$ is electrically coupled to an input terminal $D_1$ of the corresponding infrared sensing unit $D_{SR}$, and an output terminal $D_3$ of the infrared sensing unit $D_{SR}$ is electrically coupled to the corresponding recognition data line 600.

As an optional embodiment, the infrared sensing unit $D_{SR}$ may be an infrared photodiode. Specifically, the input terminal $D_1$ of the infrared sensing unit $D_{SR}$ is formed as an anode of the infrared sensing unit, the output terminal $D_3$ of the infrared sensing unit $D_{SR}$ may be formed as a cathode of the infrared sensing unit, and an infrared sensing material layer $D_2$ is disposed between the input terminal $D_1$ of the infrared sensing unit $D_{SR}$ and the output terminal $D_3$ of the infrared sensing unit $D_{SR}$.

It needs to be noted that a turn-on voltage may be supplied to the recognition gate lines row by row so that an initial signal provided at the initial signal terminal can be transmitted to the infrared sensing unit $D_{SR}$. When the infrared sensing unit $D_{SR}$ is irradiated by the non-reflected infrared light, the infrared sensing unit outputs a first signal. When the infrared sensing unit $D_{SR}$ is irradiated by the reflected infrared light, the infrared sensing unit $D_{SR}$ outputs a second signal. Based on the difference between the first signal and the second signal, characteristics of an object reflecting the infrared light may be determined.

In the present disclosure, the infrared sensing units $D_{SR}$ are driven row by row, which can improve the integration level of the display panel and is beneficial to the realization of the light weight of the display panel.

In the present disclosure, the recognition gate lines and the driving gate lines for driving the display panel to emit light may be disposed in the same layer, and the recognition data lines and the display data lines for driving the display panel to emit light may be disposed in the same layer.

As used herein, the term "same layer" refers to the relationship between layers formed simultaneously in the same step.

In the present disclosure, how the infrared sensing unit $D_{SR}$ is electrically coupled to the recognition data line 600 is not particularly limited. For example, the output terminal $D_3$ of the infrared sensing unit $D_{SR}$ may be electrically coupled to the recognition data line 600 by means of a via hole. As shown in FIG. 11, the via hole is filled with the same material as the first electrode of the switch transistor, the same material as the input terminal $D_1$ of the infrared sensing unit $D_{SR}$, and the same material as the output terminal $D_3$ of the infrared sensing unit $D_{SR}$.

Figure 10:
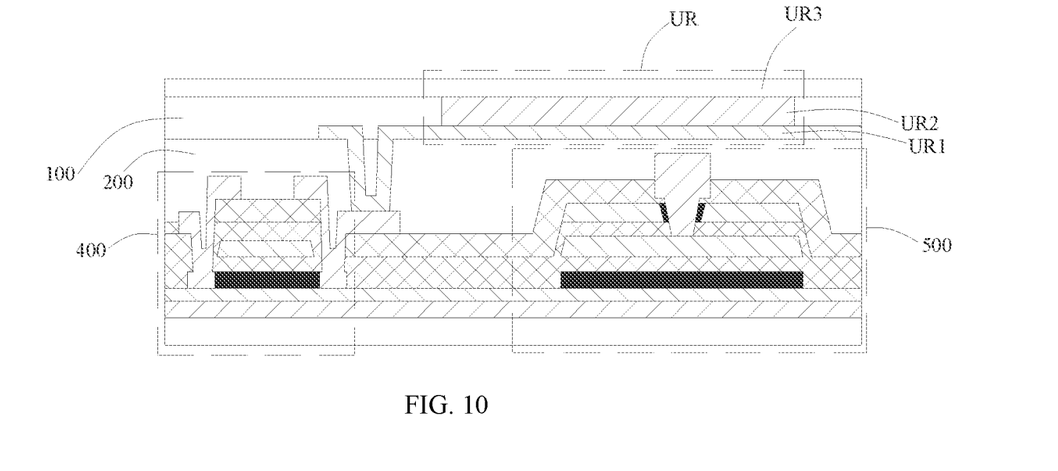
FIG. 10 is a schematic structural diagram of an infrared emitting unit in a display panel according to an embodiment of the present disclosure.

The infrared emitting units UR at different positions should be spaced apart from each other, the infrared receiving units SR at different positions should be spaced apart from each other, and the infrared emitting units UR and the infrared receiving units SR should be located on a side of the display panel close to the display surface, so that the infrared light can be transmitted toward the user and the infrared light reflected back from the user's face can be received without hindrance. Accordingly, the driving circuit structure is disposed on a display substrate of the display panel, as shown in FIG. 10, the display panel may further include a pixel defining layer 100, the pixel defining layer 100 is disposed on a side of the driving circuit structure facing away from the display substrate to define a plurality of first openings and a plurality of second openings, the infrared emitting units UR are disposed in the first openings, and the infrared receiving units SR are disposed in the second openings.

As described above, the infrared emitting unit UR is an infrared light emitting diode, and accordingly, the infrared emitting unit UR may include an anode UR1, a functional layer UR2, and a cathode UR 3. The functional layer UR2 may include a hole transport layer, a light emitting layer on the hole transport layer, a hole blocking layer on a side of the light emitting layer away from the hole transport layer, and an electron transport layer on a side of the hole blocking layer away from the light emitting layer, the light emitting layer of the functional layer UR2 is made of an infrared organic light emitting material, and the other layers of the functional layer UR2 are made of materials matching the infrared organic light emitting material. For example, the infrared organic light emitting material may be any one or more of trivalent rare earth ion complex, narrow band gap organic polymer, organic ionic dye, porphyrin, phthalocyanine or the like.

In the present disclosure, the specific type of the display panel is not particularly limited. For example, the display panel may be a liquid crystal display panel or an organic light emitting diode display panel.

When the display panel is a liquid crystal display panel, the infrared emitting unit and the infrared receiving unit may be formed on a color filter substrate. Alternatively, a recognition panel including only the infrared emitting unit and the infrared receiving unit may be formed, and attached to a light emitting surface of the liquid crystal cell in an on-cell manner.

In order to reduce the thickness of the display panel, the display panel may be an organic light emitting diode display panel. Specifically, the sub-pixel unit includes an organic light emitting diode. Accordingly, the pixel defining layer 100 also defines a plurality of pixel openings in which the organic light emitting diodes are disposed.

In order to simplify the manufacturing process, the anode of the infrared emitting unit UR and/or the infrared sensing unit $D_{SR}$ and the anode of the organic light emitting diode may be disposed in the same layer, and the cathode of the infrared emitting unit UR and/or the infrared sensing unit $D_{SR}$ and the cathode of the organic light emitting diode may be disposed in the same layer. In some embodiments, the cathode of the infrared emitting unit UR and/or the infrared sensing unit $D_{SR}$ and the cathode of the organic light emitting diode may be formed as a whole transparent electrode.

In addition, the driving circuit structure of the display panel is also used for driving the organic light emitting diode to emit light so as to realize normal display.

In the present disclosure, the driving circuit structure may include a transistor 400 for driving the infrared emitting unit UR, and a transistor 500 for driving the organic light emitting diode to emit light.

As shown in FIG. 10, in order to improve driving capability, the transistor 500 may have a double gate structure. The display panel further includes a planarization layer 200 above the driving circuit structure, and the pixel defining layer 100 is disposed above the planarization layer 200.

In the present disclosure, how to form the display panel is not particularly limited. When the display panel is an organic light emitting diode display panel, the light emitting layer of each organic light emitting diode may be formed by evaporation.

Figure 7:
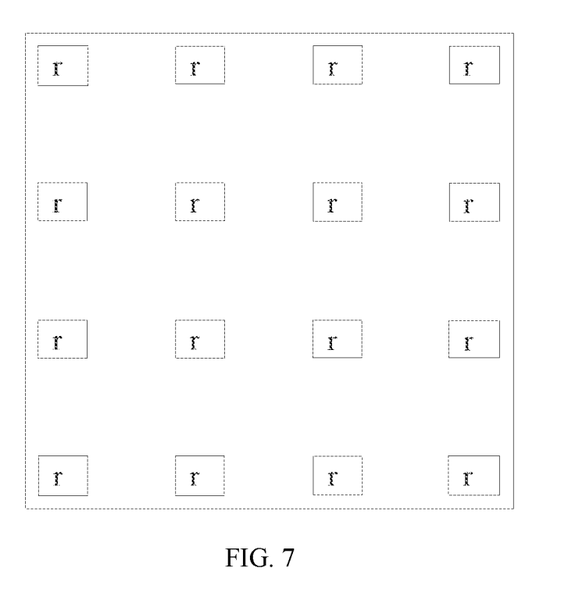
FIG. 7 is a schematic diagram of a first mask for forming red sub-pixel units.

For example, a light emitting layer of an organic light emitting diode in a red sub-pixel unit may be formed using a first mask shown in FIG. 7. As shown in FIG. 7, the first mask includes a first mask body and a plurality of first openings r penetrating through the first mask body in a thickness direction, and when the light emitting layer of the organic light emitting diode in the red sub-pixel unit is formed by evaporation, the first mask may be disposed between an evaporation source and the display substrate. As shown in FIG. 7, the first openings are arranged in a plurality of rows and a plurality of columns, and the distance between two adjacent columns of first openings r is not less than a width of the blue sub-pixel unit in the row direction. The distance between two adjacent rows of first openings r is not less than the length of the green sub-pixel unit in the column direction.

Figure 8:
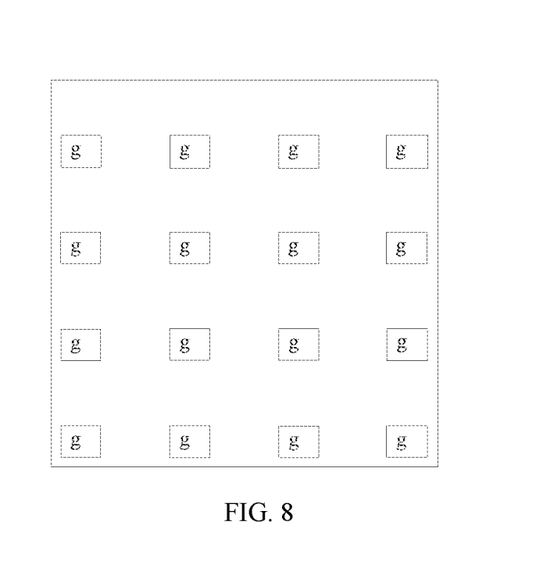
FIG. 8 is a schematic diagram of a second mask for forming green sub-pixel units.

A light emitting layer of an organic light emitting diode in a green sub-pixel unit may be formed using a second mask shown in FIG. 8. As shown in FIG. 8, the second mask includes a second mask body and a plurality of second openings g penetrating through the second mask body in the thickness direction, and when the light emitting layer of the organic light emitting diode in the green sub-pixel unit is formed by evaporation, the second mask may be disposed between the evaporation source and the display substrate. As shown in FIG. 8, the second openings are arranged in a plurality of rows and a plurality of columns, and the distance between two adjacent columns of second openings g is not less than the width of the blue sub-pixel unit in the row direction. The distance between two adjacent rows of second openings g is not less than the length of the red sub-pixel unit in the column direction.

Figure 9:
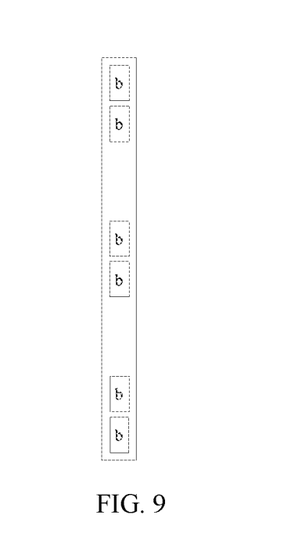
FIG. 9 is a schematic partial diagram of a third mask for forming blue sub-pixel units.

A light emitting layer of an organic light emitting diode in a blue sub-pixel unit may be formed by using a third mask, and the third mask includes a third mask body and a plurality of third openings b penetrating through the third mask body in the thickness direction. FIG. 9 shows a schematic diagram of a part of one column of openings of the third mask. As shown in FIG. 9, every two third openings b form a pair, and the interval between two adjacent pairs of third openings is greater than the interval between two third openings in the same pair, so that the arrangement of the formed blue sub-pixel units is similar to that of the third openings. That is, every two adjacent blue sub-pixel units form one pair, and the interval between two adjacent pairs of blue sub-pixel units is relatively large so as to form the infrared emitting unit and/or the infrared receiving unit.

For ease of manufacture, the interval between two third openings in the same pair is not less than 9 μm, and the interval between two adjacent pairs of third openings is not less than 40 μm.

As a second aspect of the present disclosure, there is provided a display device including a display panel that is the above display panel according to the present disclosure.

As described above, the infrared emitting unit and the infrared receiving unit are disposed in the display area of the display panel to realize facial recognition, which can not only ensure that the display device has a high display resolution but also improve the accuracy of the facial recognition. In addition, the infrared emitting unit and the infrared receiving unit are disposed in the display area, which facilitates realizing the narrow bezel.

As shown in FIG. 12, the display device may further include a facial recognition module 700 configured to generate face information according to the electrical signal generated by the infrared receiving unit. In an embodiment of the present disclosure, the facial recognition module 700 may be implemented by a processor.

The facial recognition module 700 may be integrated on a bezel of the display device or integrated on a back plate of the display device in the form of a chip. In some embodiments, the facial recognition module 700 is located outside of the display area of the display panel.

Further, the facial recognition module 700 is further configured to compare the face information generated according to the electrical signal generated by the infrared receiving unit SR with pre-stored face information, and generate a determination result.

In the present disclosure, the use of facial recognition is not particularly limited, and for example, face information may be used as authentication information for logging in an application (APP). That is to say, when the determination result indicates that the face information matches the pre-stored face information, the APP may be accessed, and when the determination result indicates that the face information does not match the pre-stored face information, the APP cannot be accessed.

For another example, the facial recognition may be used to determine whether to unlock a screen of the display device. When the determination result indicates that the face information matches the pre-stored face information, the screen of the display device may be unlocked. When the determination result indicates that the face information does not match the pre-stored face information, the screen of the display device remains locked.

When unlocking the display device by using the face information, the infrared emitting unit and the infrared receiving unit may be driven even if the sub-pixel units of the display panel are in an off state. After the screen is unlocked, the infrared emitting unit and the infrared receiving unit are turned off, so that repeated verification is avoided.

In order to save power, a lifting wake-up module may be provided in the display device, and the lifting wake-up module may sense the position state of the display device. When the lifting wake-up module senses that the display device is lifted by an operator and the screen of the display device is in a screen locking state, the infrared emitting unit and the infrared receiving unit may be driven.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A display panel, having a display area and comprising:
    a plurality of infrared emitting units and a plurality of infrared receiving units in the display area,
    wherein the plurality of infrared emitting units are configured to emit infrared light to outside of the display panel, and the plurality of infrared receiving units are configured to receive the infrared light reflected by an object outside the display panel and output an electrical signal according to the received infrared light,
    the display area comprises a plurality of pixel sub-regions arranged in a plurality of rows and a plurality of columns, and each of the plurality of pixel sub-regions comprises a plurality of sub-pixel units and one of the infrared emitting unit and the infrared receiving unit,
    a size of a light emitting surface of the infrared emitting unit is larger than a size of a light emitting surface of each sub-pixel unit and a size of a receiving surface of the infrared receiving unit, and
    each of the plurality of pixel sub-regions comprises a red sub-pixel unit, a green sub-pixel unit, and a blue sub-pixel unit,
    the red sub-pixel unit, the green sub-pixel unit, the blue sub-pixel unit and the infrared emitting unit or the infrared receiving unit comprised in each pixel sub-region are arranged in two columns, the red sub-pixel unit and the green sub-pixel unit are in one of the two columns, and the blue sub-pixel unit and the infrared emitting unit or the infrared receiving unit comprised in the pixel sub-region are in the other of the two columns; in each column of sub-pixel units where the blue sub-pixel units are located, every two adjacent blue sub-pixel units form a pair, and the infrared receiving unit and/or the infrared emitting unit are disposed between two adjacent pairs of blue sub-pixel units.

2. The display panel of claim 1, wherein each column of pixel sub-regions comprise a plurality of pairs of pixel sub-regions, each pair of pixel sub-regions comprises a first pixel sub-region and a second pixel sub-region adjacent in a column direction, the first pixel sub-region comprises the infrared emitting unit, and the second pixel sub-region comprises the infrared receiving unit.

3. The display panel of claim 2, wherein the infrared emitting unit comprised in the first pixel sub-region is adjacent in the column direction to the infrared receiving unit comprised in the second pixel sub-region, and
the second sub-pixel unit comprised in the first pixel sub-region is adjacent in the column direction to the first sub-pixel unit comprised in the second pixel sub-region.

4. The display panel of claim 1, wherein each column of pixel sub-regions comprise a plurality of pairs of pixel sub-regions, and each pair of pixel sub-regions comprises a first pixel sub-region and a second pixel sub-region adjacent in a column direction; and
the first pixel sub-region and the second pixel sub-region both comprise the infrared emitting unit, or the first pixel sub-region and the second pixel sub-region both comprise the infrared receiving unit.

5. The display panel of claim 4, wherein the first pixel sub-region and the second pixel sub-region share one infrared emitting unit, or the first pixel sub-region and the second pixel sub-region share one infrared receiving unit.

6. The display panel of claim 4, wherein in a same column of pixel sub-regions, both the infrared receiving unit and the infrared emitting unit are disposed.

7. The display panel of claim 1, wherein in each pixel sub-region, a sum of a number of the plurality of sub-pixel units and a number of the infrared receiving unit or the infrared emitting unit in the pixel sub-region is the same.

8. The display panel of claim 4, wherein either the infrared receiving unit or the infrared emitting unit is provided in a same column of pixel sub-regions.

9. The display panel of claim 8, wherein the plurality of pixel sub-regions comprise first pixel sub-region columns and second pixel sub-region columns, each of the first pixel sub-region column and the second pixel sub-region column comprises multiple pixel sub-regions arranged in the column direction, the first pixel sub-region columns and the second pixel sub-region columns are alternately arranged in a row direction, the infrared emitting unit is disposed in the first pixel sub-region column, and the infrared receiving unit is disposed in the second pixel sub-region column.

10. The display panel of claim 9, wherein the infrared emitting unit and the infrared receiving unit are in different rows.

11. The display panel of claim 1, wherein the infrared emitting unit comprises an infrared light emitting diode, and the display panel further comprises a driving circuit structure configured to drive the infrared emitting unit to emit the infrared light and drive the infrared receiving unit to convert the received infrared light into the electrical signal.

12. The display panel of claim 11, wherein each infrared receiving unit comprises a switch transistor and an infrared sensing unit, the driving circuit structure comprises a plurality of recognition gate lines and a plurality of recognition data lines, the plurality of infrared receiving units are arranged in a plurality of rows and a plurality of columns, the plurality of recognition gate lines are in one-to-one correspondence with the plurality of rows of infrared receiving units, and the plurality of recognition data lines are in one-to-one correspondence with the plurality of columns of infrared receiving units; and
a gate electrode of the switch transistor is electrically coupled to a corresponding recognition gate line, a first electrode of the switch transistor is configured to be electrically coupled to an initial signal terminal, a second electrode of the switch transistor is electrically coupled to an input terminal of a corresponding infrared sensing unit, and an output terminal of the infrared sensing unit is electrically coupled to a corresponding recognition data line.

13. The display panel of claim 11, wherein the driving circuit structure is on a display substrate of the display panel, the display panel further comprises a pixel defining layer on a side of the driving circuit structure facing away from the display substrate to define a plurality of first openings in which the plurality of infrared emitting units are disposed and a plurality of second openings in which the plurality of infrared receiving units are disposed.

14. The display panel of claim 13, wherein each sub-pixel unit comprises an organic light emitting diode, the pixel defining layer further defines a plurality of pixel openings, the organic light emitting diode is disposed in the pixel opening, and the driving circuit structure is further configured to drive the organic light emitting diode to emit light.

15. A display device, comprising the display panel of claim 1.

16. The display device of claim 15, wherein the display device further comprises a processor configured to: generate face information according to the electrical signal generated by the infrared receiving unit; and compare the generated face information with pre-stored face information to generate a determination result.

* * * * *